J. D. DUDLEY.
CLAMPING DEVICE.
APPLICATION FILED MAR. 18, 1914.

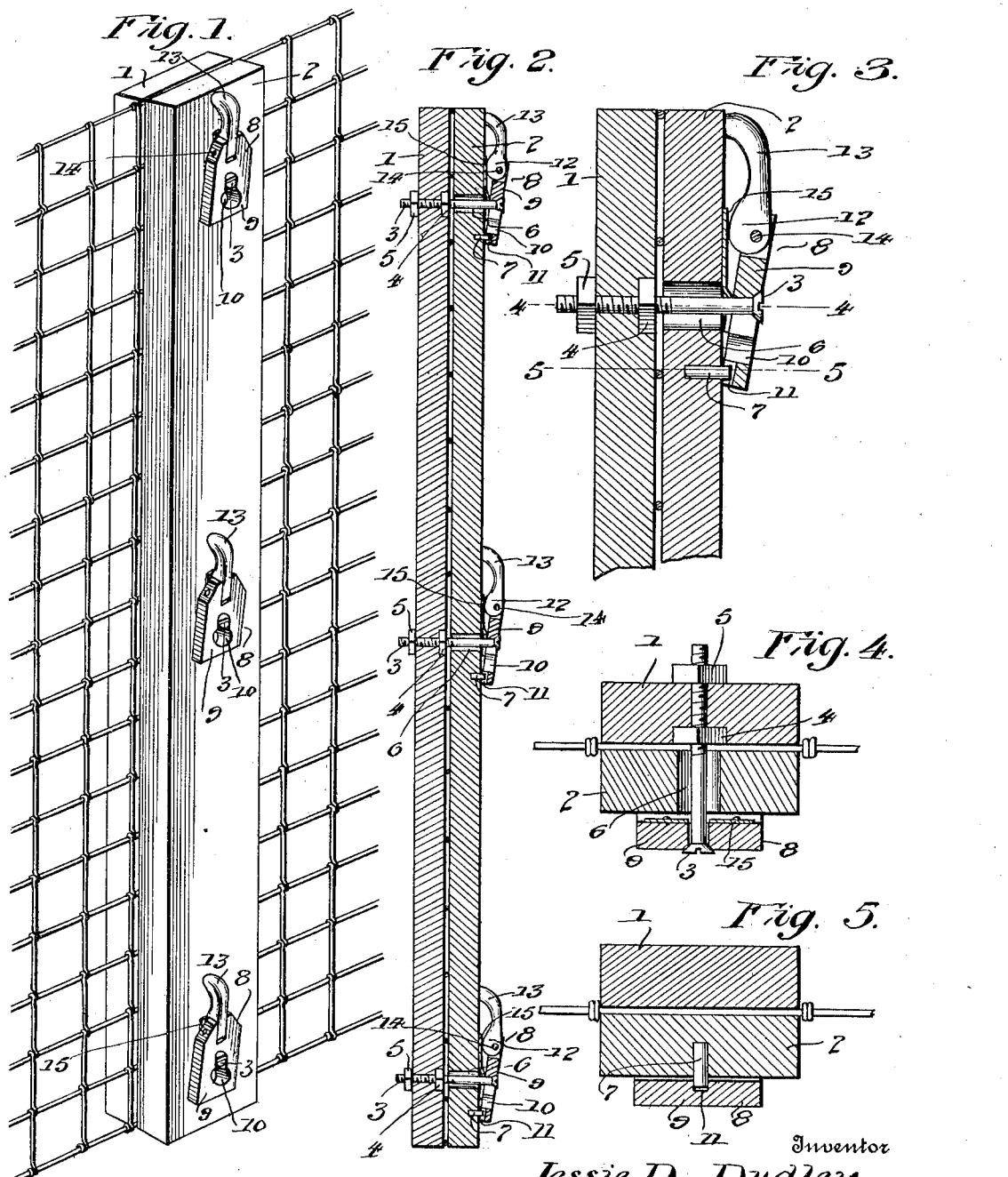

1,112,990.

Patented Oct. 6, 1914.
2 SHEETS—SHEET 2.

Witnesses
Frederick R. Moran
Wm. ...

Inventor
Jessie D. Dudley
By Victor J. Evans
Attorney

UNITED STATES PATENT OFFICE.

JESSIE D. DUDLEY, OF BARRY, ILLINOIS.

CLAMPING DEVICE.

1,112,990. Specification of Letters Patent. Patented Oct. 6, 1914.

Application filed March 18, 1914. Serial No. 825,626.

*To all whom it may concern:*

Be it known that I, JESSIE D. DUDLEY, a citizen of the United States, residing at Barry, in the county of Pike and State of Illinois, have invented new and useful Improvements in Clamping Devices, of which the following is a specification.

The present invention relates to clamping devices for wire fences, or the like, and resides in the construction, combination and arrangement of parts set forth in the following specification and falling within the scope of the appended claim.

The object of the invention is to simplify and improve the existing art by producing a clamp which may be quickly and easily attached to or removed from a fence without the employment of removable elements in the nature of bolts or the like.

The drawings illustrate a simple and satisfactory reduction of the improvement to practice, the same, however, being susceptible to such changes as fall within the scope of the claim.

Figure 6:
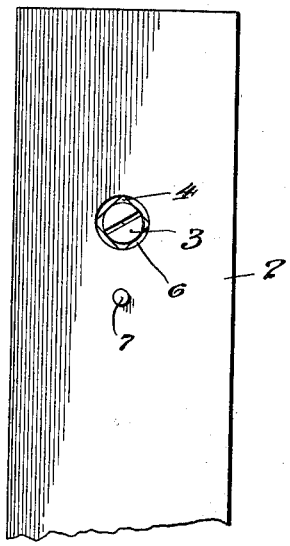
Figure 7:
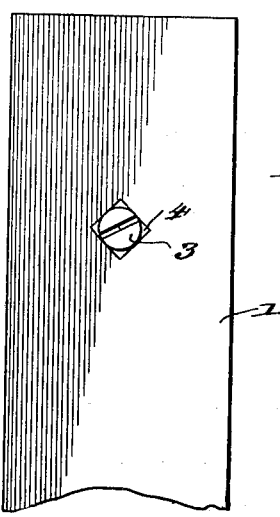
Figure 8:
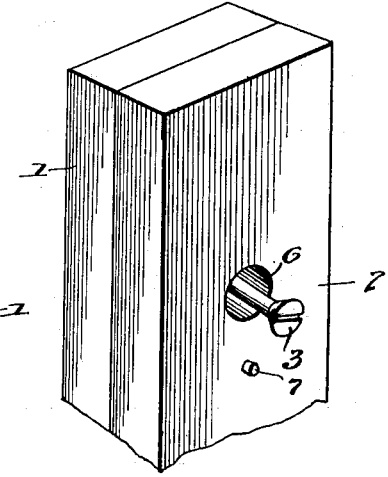
Figure 9:
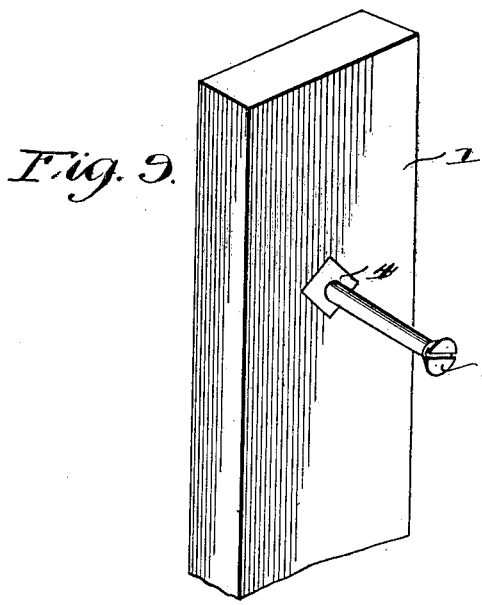
Figure 10:
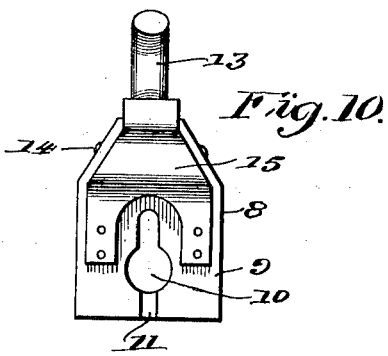
Figure 11:
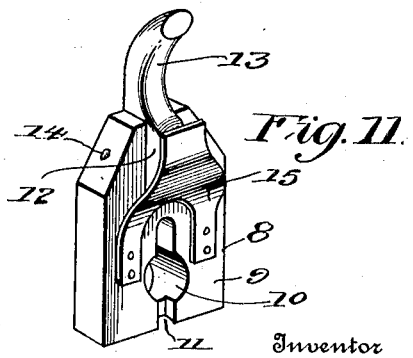

In the said drawings: Figure 1 is a perspective view illustrating the improvement in applied position upon a fence, Fig. 2 is a central vertical sectional view through the same, Fig. 3 is a similar sectional view but taken upon an enlarged scale, Fig. 4 is a sectional view on the line 4—4 of Fig. 3, Fig. 5 is a similar sectional view on the line 5—5 of Fig. 3, Fig. 6 is a detail enlarged elevation of the improvement, the locking or clamping element being removed, Fig. 7 is a similar view of the inner member of the improvement, Fig. 8 is a detail perspective view of the structure illustrated in Fig. 6, Fig. 9 is a detail perspective view of the structure illustrated in Fig. 7, Fig. 10 is a rear elevation of the locking clamp, and Fig. 11 is a perspective view of the same.

The clamp includes essentially an inner elongated substantially rectangular plate 1 and a similar outer plate 2. The plate 1 is provided at suitable spaced intervals with right angularly arranged adjustable elements in the nature of headed screws 3. The plate 1 is preferably formed of wood, and has embedded in its inner face a series of nuts 4 which lie flush with the inner face of the plate, the screws 3 engaging the threads of the said nuts and passing through openings in the plate and having their projecting ends also provided with locking nuts 5 which bind against the outer face of the said plate 1. The outer plate 2 is provided with openings 6, corresponding in number with the screws 3, the said openings being of a sufficient area to permit the head of the screws passing therethrough and projecting over the outer face of the said plate 2. The plate 2, at a suitable distance from each of its openings 6, is provided with an outwardly extending stud 7, the said stud being arranged in a line with the center of the openings. It is, of course, to be understood that the plate 1 is to be arranged upon one of the sides of the wire fence, the plate 2 being arranged upon the opposite side of the wire fence, the screws 3 projecting through the mesh of the wire.

To quickly connect the plates in order to cause the same to exert a pressure upon the wire fence between the said plates, I provide locking clamps 8. Each of these clamps includes substantially rectangular body 9 which is provided with a key-hole opening 10, and is formed with a depression or channel 11 below the said key-hole opening, the channel communicating with what I will term the lower end of the clamp. The body has its upper end centrally bifurcated for the reception of the cam head 12 of a lever 13, the said head being pivoted to the body, as at 14. Secured upon the under face of the body above its key-hole opening 10 and arranged to be contacted by the cam head 12 is a flat spring plate 15 which serves as means for preventing the cam head 12 making indentations or depressions in the plates when the cam is forced against the plate as will now be described. The body 8 is arranged upon the outer plate 2 permitting the head of the screw 3 first passing through the enlarged opening in the key-hole slot 10. The body is then moved longitudinally to bring the shank of the screw within the reduced opening of the key-hole slot, the head of the said screw being arranged upon the outer face of the body or upon the outer angular edges provided between the side walls provided by the said reduced slot and the face of the body. This movement forces the channeled portion 11 over the stud 7, securing the locking clamp against lateral movement. The lever 13 is then operated to force its cam head 12 against the flat plate 15, effectively locking the clamp 8 upon the device as well as forcing the members 1 and 2 into tight frictional contact to bind the mesh of the fence therebetween.

From the above description, taken in connection with the accompanying drawings, the simplicity of the device as well as the advantages thereof will, it is thought, be perfectly apparent to those skilled in the art to which such invention appertains without further detailed description.

Having thus described the invention, what I claim is:

In a device for the purpose set forth, an inner plate having members provided with threaded bores embedded therein and lying flush with one of the faces of the plate, an adjustable headed and threaded member engaging with the threaded bore of the said embedded member, a locking nut for the said adjustable member, a second plate having an opening through which the head of the adjustable member passes, said second member having a stud arranged adjacent its opening, a locking clamp, said clamp including a body having a key-hole slot whereby the same may be passed over and brought into engagement with the head of the adjustable member, the body having a channel to receive the stud, the body being further provided with a pivoted cam lever, a flat spring plate arranged upon the body and adapted to be engaged by the cam lever when the same is swung to secure the locking clamp upon the second mentioned plate.

In testimony whereof I affix my signature in presence of two witnesses.

JESSIE D. DUDLEY.

Witnesses:
W. B. SMITH,
JOHN E. POWELL.

Copies of this patent may be obtained for five cents each, by addressing the "Commissioner of Patents, Washington, D. C."